3,341,523
2- OR 3-ALKYL-2,3-EPITHIO-5α-ANDROSTAN-17β-OLS AND THEIR 17-ALKANOATES, AND PRODUCTION THEREOF

Taichiro Komeno, Osaka, Japan, assignor to Shionogi & Co. Ltd., Osaka, Japan
No Drawing. Filed Feb. 23, 1966, Ser. No. 529,210
2 Claims. (Cl. 260—239.5)

The present invention relates to 2- or 3-alkyl-2,3-epithio-5α-androstan-17β-ols and their 17-alkanoates represented by either one of the following general formula:

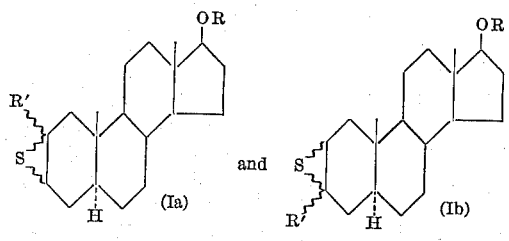

wherein R is a hydrogen atom or a lower alkanoyl group (e.g. formyl, acetyl, propionyl, butyryl, isobutyryl, valeryl, isovaleryl, trimethylacetyl, caproyl, t-butylacetyl, enanthoyl, capryloyl), R' is a lower alkyl group (e.g. methyl, ethyl, propyl) and the ripple mark ($\xi$) represents a generic indication of α- and β-configurations, and production thereof.

A basic object of the present invention is to embody the 2-alkyl-2,3-epithio-steroids (Ia) and the 3-alkyl-2,3-epithio-steroids (Ib). Another object of this invention is to embody the 2-alkyl-2,3-epithio-steroids (Ia) and the 3-alkyl-2,3-epithio-steroids (Ib) having peculiar hormonic activity. A further object of the invention is to embody a process for preparing the 2-alkyl-2,3-epithio-steroids (Ia) and the 3-alkyl-2,3-epithio-steroids (Ib). These and other objects will be apparent to those conversant with the art to which the present invention pertains from the subsequent description.

The substantial conversion in the process of the present invention is represented by the following scheme showing only the A ring of the steroid skeleton:

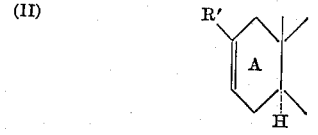

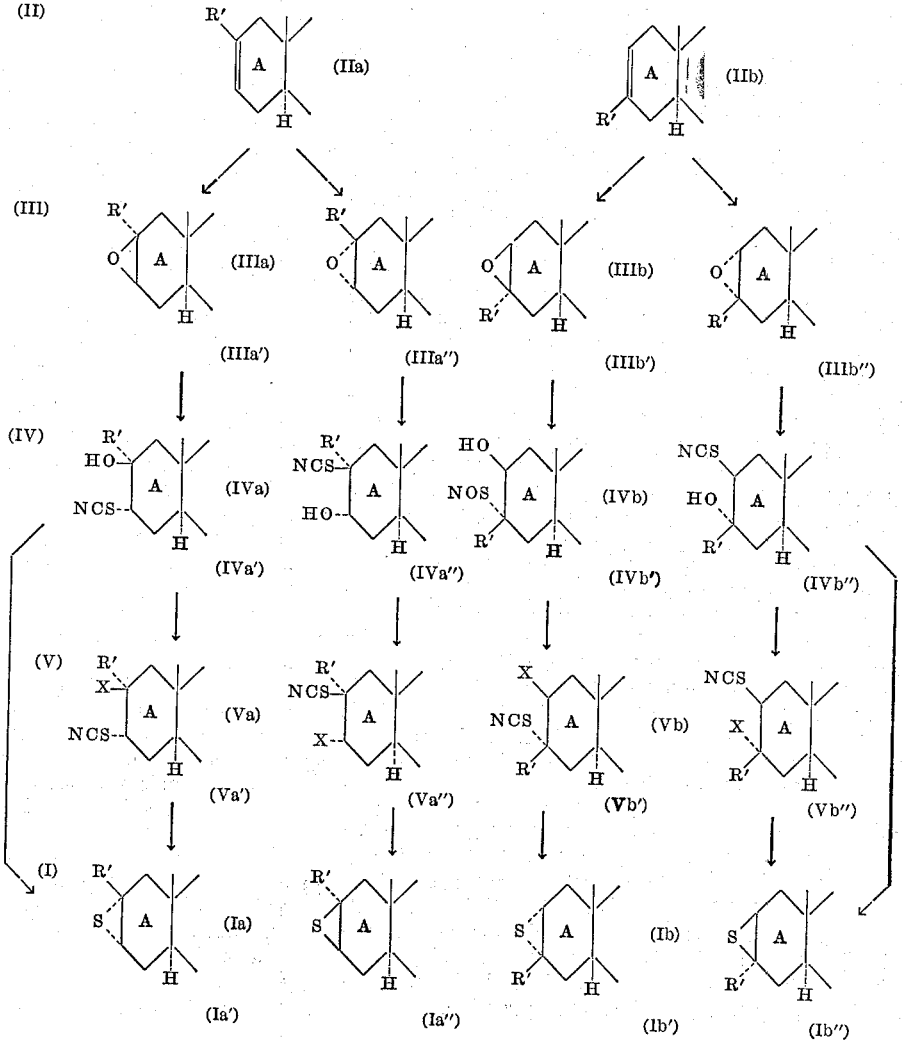

wherein X is a halogen atom (e.g. chlorine, bromine, iodine), a lower alkanoyloxy group (e.g. acetyloxy, propionyloxy, butyryloxy), a lower alkanesulfonyloxy group (e.g. methanesulfonyloxy, ethanesulfonyloxy), a benzenesulfonyloxy group or a lower alkylbenzenesulfonyloxy group (e.g. toluenesulfonyloxy) and R' has the same significance as designated above.

Examples of the 2-alkyl-$\Delta^2$-steroid (IIa) and the 3-alkyl-$\Delta^2$-steroid (IIb) available as the starting materials in the present invention include 2-methyl-5α-androst-2-en-17β-ol and its 17-formate, acetate, propionate, butyrate, isobutyrate, valerate, isovalerate, trimethylacetate, caproate, t-butylacetate, enanthate, caprylate, 3-methyl-5α-androst-2-en-17β-ol and its 17-acetate, propionate, butyrate, isobutyrate, valerate, trimethylacetate, 2-ethyl-5α-androst-2-en-17β-ol and its 17-acetate, propionate, 3-ethyl-5α-androst-2-en-17β-ol and its 17-acetate, propionate, 2-propyl-5α-androst-2-en-17β-ol and its 17-acetate, 3-propyl-5α-androst-2-en-17β-ol and its 17-formate, acetate, propionate, etc.

According to the present invention, the starting 2- or 3-alkyl-5α-androst-2-en-17β-ol or its lower alkanoate (II) is first subjected to epoxy linkage-formation. The epoxy linkage-formation may be effected by treatment with an epoxydizing agent such as a peracid (e.g. perbenzoic acid, monoperphthalic acid, peracetic acid, trifluoroperacetic acid, m-chloroperbenzoic acid), ozone or chromium trioxide, or a combination of a halogenating agent such as a hypohalogenic acid (e.g. hypochlorous acid), an N-halocarbonamide or dicarbonimide (e.g. N-bromoacetamide (N-bromosuccinimide, N-iodosuccinimide, N-chlorophthalimide), a halonium compound (e.g. iodine and silver acetate, bromine and silver benzoate, bromine and methanol) or the like and a base (e.g. alumina, pyridine, sodium bicarbonate, potassium carbonate, potassium acetate, sodium methoxide, potassium hydroxide). Treatment with the epoxydizing agent may be carried out in an inert solvent (e.g. benzene, ether, dichloromethane, chloroform) at a temperature from about −10° C. to the boiling point of the solvent used within a period from about 1 to about 150 hours. Treatment with the combination of a halogenating agent and a base may be carried out in one step wherein the introduction of a halogen atom is followed by spontaneous dehydrohalogenation to form an epoxy linkage or in two steps wherein the intermediarily produced halohydrin is isolated prior to the subsequent dehydrohalogenation with a base. The halogenation may be carried out in an inert solvent (e.g. water, methanol, acetic acid, chloroform, dichloromethane, carbon tetrachloride, ether, benzene) at a temperature from about 0° C. to the boiling point of the solvent used within about 10 hours, optionally in the presence of a catalyst such as an acid (e.g. perchloric acid, acetic acid). The dehydrohalogenation may be carried out in an inert solvent (e.g. water, methanol, ethanol, isopropanol, acetone) at a temperature from room temperature (10 to 20° C.) to the boiling point of the solvent used within about 24 hours. The halogenation followed by the spontaneous dehydrohalogenation may be carried out by treatment with a halogenating agent in the presence of a base, preferably an organic base (e.g. pyridine). The configuration of the epoxy linkage in the resulting product is associated with the kind of the starting 2- or 3-alkyl-$\Delta^2$-steroid (II) and the adopted procedure. For instance, the reaction of the 2-alkyl-$\Delta^2$-steroid (IIa) with the combination of a halogenating agent and a base affords the 2-alkyl-2β-3β-epoxy-steroid (IIIa'), while that with a peracid gives the 2-alkyl-2α,3α-epoxy-steroid (IIIa''). Further, for instance, the reaction of the 3-alkyl-$\Delta^2$-steroid (IIb) with the combination of a halogenating agent and a base affords the 3-alkyl-2β,3β-epoxy-steroid (IIIb') and the 3-alkyl-2α,3α-epoxy-steroid (IIIb''), while that with a peracid gives the 3-alkyl-2α,3α-epoxy-steroid (IIIb'').

The 2- or 3-alkyl-2,3-epoxy-steroid (III) is then subjected to epoxy linkage-fission. The epoxy linkage-fission may be effected by reacting the 2- or 3-alkyl-2,3-epoxy-steroid (III) substantially with thiocyanic acid. Practically, the reaction is carried out by treating the 2- or 3-alkyl-2,3-epoxy-steroid (III) with thiocyanic acid or its salt (e.g. sodium thiocyanate) in an inert solvent (e.g. water, methanol, acetone, ether, tetrahydrofuran, dioxane, chloroform, dichloromethane) at a temperature from about 0° C. to the boiling point of the solvent used within about 5 days, if required, in the presence of catalytic influence of an acid (e.g. acetic acid) or a base (e.g. pyridine).

The resultant thiocyanatohydrin (IV) is then subjected to epithio linkage-formation as it is or after converting the hydroxyl group at the 2- or 3-position into a halogen atom or an acyloxy group (the term "acyloxy" being intended to mean lower alkanoyloxy, lower alkanesulfonyloxy, benzenesulfonyloxy and lower alkylbenzenesulfonyloxy, inclusively). For the previous conversion of the hydroxyl group into a halogen atom, the thiocyanatohydrin (IV) may be treated in a per se conventional halogenation procedure. The conversion of the hydroxyl group into the acyloxy group may be performed by treating the thiocyanatohydrin (IV) in a per se conventional acylation procedure. The epithio linkage-formation may be effected by reacting the free thiocyanatohydrin (IV) or the thiocyanato halide or acylated thiocyanatohydrin (V) with a basic agent in an inert solvent (e.g. methanol, ethanol, propanol, benzene, toluene, petroleum ether, diglyme). As the basic agent, there may be employed an optional base having weak to strong basicity such as alumina, pyridine, sodium bicarbonate, potassium carbonate, sodium acetate, sodium methoxide or potassium hydroxide. It is generally preferred to carry out the reaction at a relatively mild condition, i.e. at a temperature not higher than 100° C. within about 5 days.

In the course of the above conversion, the hydroxyl group or the lower alkanoyloxy group at the 17-position may be altered each other, naturally or optionally. The optional conversion of the hydroxyl group into a lower alkanoyloxy group may be carried out by a per se conventional procedure.

Examples of the resulting 2-alkyl-2,3-epithio-steroid (Ia) and the 3-alkyl-2,3-epithio-steriod (Ib) include 2β-methyl-2α,3α-epithio-5α-androstan-17β-ol and its 17-formate, acetate, propionate, butyrate, isobutyrate, valerate, isovalerate, trimethylacetate, carproate, t-butylacetate, enanthate, caprylate, 2α-methyl-2β,3β-epithio-5α-androstan-17β-ol and its 17-acetate, propionate, butyrate, valerate, trimethylacetate, t - butylacetate, enanthate, 3β-methyl-2α,3α-epithio-5α-androstan-17β-ol and its 17-acetate, propionate, butyrate, isobutyrate, valerate, trimethylacetate, 3α-methyl-2β,3β-epithio-5α-androstan-17β-ol and its 17-acetate, propionate, 2α-ethyl-2β,3β-epithio-5α-androstan-17β-ol and its 17-acetate, 3β-ethyl-2α,3α-epithio-5α-androstan-17β-ol and its 17-acetate, 3α-ethyl-2β,3β-epithio-5α-androstan-17β-ol and its 17-acetate, 2β-propyl-2α,3α-epithio-5α-androstan-17β-ol and its 17-acetate, 2α-propyl-2β,3β-epithio-5α-androstan-17β-ol and its 17-acetate, 3β-propyl-2α,3α-epithio-5α-androstan-17β-ol and its 17-formate, acetate, propionate, 3α-propyl-2β,3β-epithio-5α-androstan-17β-ol and its 17-acetate, etc.

The 2-alkyl-2,3-epithio-steroid (Ia) and the 3-alkyl-2,3-epithio-steroid (Ib) prepared by the present process possess peculiar hormonic activity. Thus, they can produce potent myotropic and androgenic activities with a favorable myotropic/androgenic ratio. Accordingly, they are useful as anabolic agents. It is especially notable that the 2-alkyl-2,3-epithio-steroid (Ia) and the 3-alkyl-2,3-epithio-steriod (Ib) are markedly less potent than the corresponding 2- or 3-desalkyl-2,3-epithio-steroid in anti-estrogenic activity, which should be rather considered as a side effect for anabolic agents. For instance, the anti-estrogenic activity of 2β-methyl-2α,3α-epithio-5α-androstan-17β-ol (Ia: R=CH$_3$) (β), R'=H) is about ⅟₃₀ that of 2α,3α-epithio-5α-androstran-17β-ol in the test using mice. Accordingly, the 2-alkyl-2,3-epithio-steroid (Ia) and the 3-alkyl-2,3-epithio-steroid (Ib) of the present invention are anabolic agents having less side effect. It is further notable that the compounds (Ia or Ib) having a lower alkanoyloxy group at the 17-position show the prolonged activities.

The 2-alkyl-2,3-epithio-steroid (Ia) and the 3-alkyl-2,3-epithio-steroid (Ib) of the present invention are used in medicine solely or in combination or in preparation in conjunction with a solid or liquid pharmaceutical excipient. The preparations are prepared by as such known methods, for example, with the use of pharmaceutical organic or inorganic excipients suitable for parenteral, enteral or local administration. Suitable excipients are substances that do not react with the products of the present invention such, for example, as water, vegetable oils, benzyl alcohols, polyethylene glycols, gelatin, lactose, starches, magnesium stearate, talc, white petroleum jelly, isopropyl myristate or other known pharmaceutical excipients. There are especially made preparation for parenteral administration, preferably solutions, above all oily or aqueous solutions, furthermore suspensions, emulsions or implants; for enteral administration there are similarly also made tablets or dragees, and for local administration also ointments or creams. If desired, auxiliaries may be added thereto, such as preserving, stabilizing, wetting or emulsifying agents, salts for regulating the osmotic pressure, or buffers. They may also contain other therapeutically useful substances. The preparations are obtained in the customary way. The content of active compound in these preparations, such as of a tablet or an ampoule, is preferably 0.1 to 200 mg. or 0.03 to 60%. The average dose is preferably 5 to 100 mg./week.

The following examples represent presently-preferred embodiments of the present invention, but it is to be understood that the examples are given by way of illustration only and not of limitation.

*Example 1*

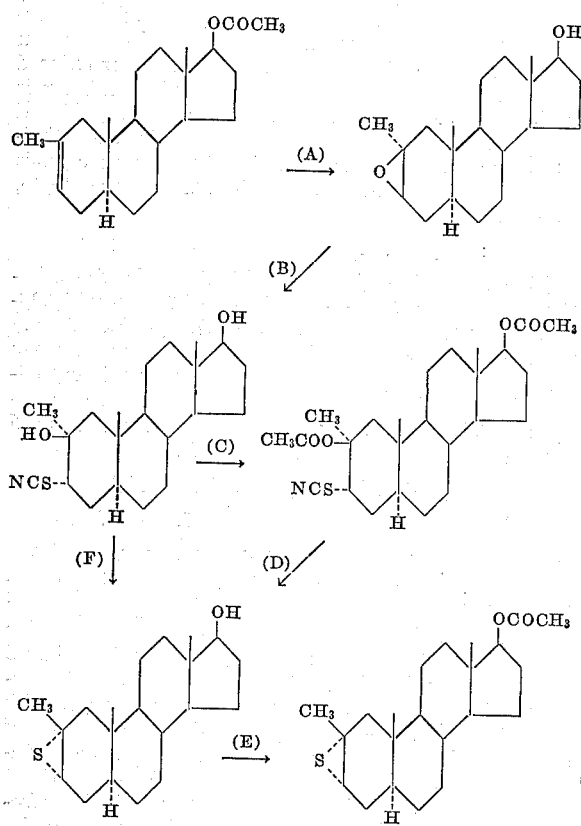

(A) *Preparation of 2α-methyl-2β,3β-epoxy-5α-androstan-17β-ol.*—To a solution of 2-methyl-5α-androst-2-en-17β-ol-17-acetate [Ringold et al.: J. Am. Chem. Soc., 81, 427 (1959)] (979 mg.) in dioxane (12 ml.), there are added water (3 ml.), N-bromoacetamide (613 mg.) and 60% perchloric acid (0.42 ml.) in order, and the resultant mixture is stirred at room temperature for 1.5 hours. After addition of a mixture of ice and water (90 ml.), the precipitate is collected by filtration, washed with water, dried and crystallized from hexane to give 2α-methyl-3α-bromo-5α-androstane-2β,17β-diol 17-acetate (490 mg.) as crystals melting at 161 to 163° C. $[\alpha]_D^{28} + 54.6 \pm 2°$ (c.=0.961, CHCl$_3$).

IR: $\nu_{max.}^{Nujol}$ cm.$^{-1}$: 3558, 3510, 3406, 1739, 1712, 1275, 1263, 1248, 960, 895. $\nu_{max.}^{CCl_4}$ cm.$^{-1}$: 3614, 3485, 1740, 1249, 1034

To a solution of the above prepared bromohydrin (2.922 g.) in isopropanol (65 ml.), there is added potassium hydroxide (3 g.), and the resulting mixture is refluxed for 3 hours. After removal of the solvent by distillation under reduced pressure, a large amount of water is added thereto. The resultant mixture is extracted with dichloromethane. The extract is washed with water, dried over anhydrous sodium sulfate and concentrated. The residue is crystallized from a mixture of acetone and hexane to give 2α-methyl-2β,3β-epoxy-5α-androstan-17β-ol (1.973 g.) as crystals melting at 171.5 to 173.5° C. $[\alpha]_D^{27.5} + 56.7 \pm 2°$ (c.=0.991, CHCl$_3$).

IR: $\nu_{max.}^{Nujol}$ cm.$^{-1}$: 3464, 3410, 1051, 840, 800

(B) *Preparation of 2α-methyl-3α-thiocyanato-5α-androstane-2β,17β-diol.*—To a solution of 2α-methyl-2β,3β-epoxy-5α-androstan-17β-ol (1.987 g.) in dichloromethane (50 ml.), there is added a solution of thiocyanic acid prepared from potassium thiocyanate (10 g.), phosphoric acid (15 g.) and ether (40 ml.), and the resultant mixture is allowed to stand at room temperature overnight. The reaction mixture is combined with chloroform, washed with water, sodium carbonate solution and water in order, dried over anhydrous sodium sulfate and concentrated under reduced pressure. The residue is crystallized from acetone to give 2α-methyl-3α-thiocyanato-5α-androstane-2β,17β-diol (1.585 g.) as crystals melting at 218 to 220° C. $[\alpha]_D^{30} + 119.0 \pm 2°$ (c.=1.066, CHCl$_3$—MeOH (4:1))

IR: $\nu_{max.}^{Nujol}$ cm.$^{-1}$: 3480, 3372, 2155, 1043

(C) *Preparation of 2α-methyl-3α-thiocyanato-5α-androstane-2β,17β-diol 2,17-diacetate.*—To a solution of 2α-methyl-3α-thiocyanato-5α-androstane-2β,17β-diol (1.311 g.) in a mixture of acetic acid (25 ml.) and acetic anhydride (4 ml.), there is added p-toluenesulfonic acid (130 mg.), and the resultant mixture is allowed to stand at room temperature overnight. The reaction mixture is poured into a mixture of ice and water. The precipitate is collected by filtration, washed with water, dried and crystallized from a mixture of acetone and hexane to give 2α-methyl-3α-thiocyanato-5α-androstane-2β,17β-diol 2,17-diacetate (1.292 g.) as crystals melting at 164 to 166° C. $[\alpha]_D^{29} + 81.0 \pm 2°$ (c.=0.974, CHCl$_3$).

IR: $\nu_{max.}^{Nujol}$ cm.$^{-1}$: 2160, 1736, 1255, 1242, 1037

(D) *Preparation of 2β-methyl-2α,3α-epithio-5α-androstan-17β-ol.*—To a solution of potassium hydroxide (935 mg.) in ethanol (40 ml.), there is added 2α-methyl-3α-thiocyanato-5α-androstane-2β,17β-diol 2,17-diacetate (927 mg.), and the resulting mixture is refluxed for 2 hours. After removal of ethanol by distillation, water is added thereto. The resultant mixture is extracted with dichloromethane. The extract is crystallized from a mixture of acetone and hexane and recrystallized from aqueous methanol to give 2β-methyl-2α,3α-epithio-5α-androstan-17β-ol (325 mg.) as crystals melting at 151.5 to 153.5° C. $[\alpha]_D^{27} + 27.5 \pm 2°$ (c.=1.213, CHCl$_3$).

IR: $\nu_{max.}^{Nujol}$ cm.$^{-1}$: 3322, 1053 1038, 959

(E) *Preparation of 2β-methyl-2α,3α-epithio-5α-androstan-17β-ol 17-acetate.* — 2β-methyl-2α,3α-epithio-5α-androstan-17β-ol (115 mg.) is dissolved in a mixture of pyridine (4 ml.) and acetic anhydride (1 ml.), and the resulting mixture is allowed to stand at room temperature overnight. The reaction product is crystallized from aqueous acetone to give 2β-methyl-2α,3α-epithio-5α-androstan-17β-ol 17-acetate as crystals melting at 142.5 to 144.5° C. $[\alpha]_D^{26} + 29.7 \pm 2°$ (c.=1.111, CHCl$_3$).

IR: $\nu_{max.}^{Nujol}$ cm.$^{-1}$: 1731, 1254, 1049, 1041, 1023, 956

In the similar manner, treatments of 2β-methyl-2α,3α-epithio-5α-androstan-17β-ol with propionic anhydride in aqueous potassium carbonate solution or pyridine, butyric anhydride in pyridine, valeric anhydride in trimethylamine, trimethylacetyl chloride in pyridine and enanthyl bromide in pyridine afford respectively the corresponding 12-propionate, butyrate, valerate, trimethylacetate and enanthate.

(F) *Preparation of 2β-methyl-2α,3α-epithio-5α-androstan-17β-ol.*—To a solution of 2-methyl-3α-thiocyanato-5α-androstane-2β,17β-diol (289 mg.) in dioxane (5 ml.), there is added a solution of potassium hydroxide (0.5 g.) in 90% methanol (10 ml.), and the resultant mixture is stirred at room temperature (10 to 20° C.) overnight. The reaction mixture is concentrated under reduced pressure, diluted with water and extracted with dichloromethane. The extract is crystallized from aqueous methanol to give 2β-methyl-2α,3α-epithio-5α-androstan-17β-ol as crystals melting at 151.5 to 153.5° C.

*Example 2*

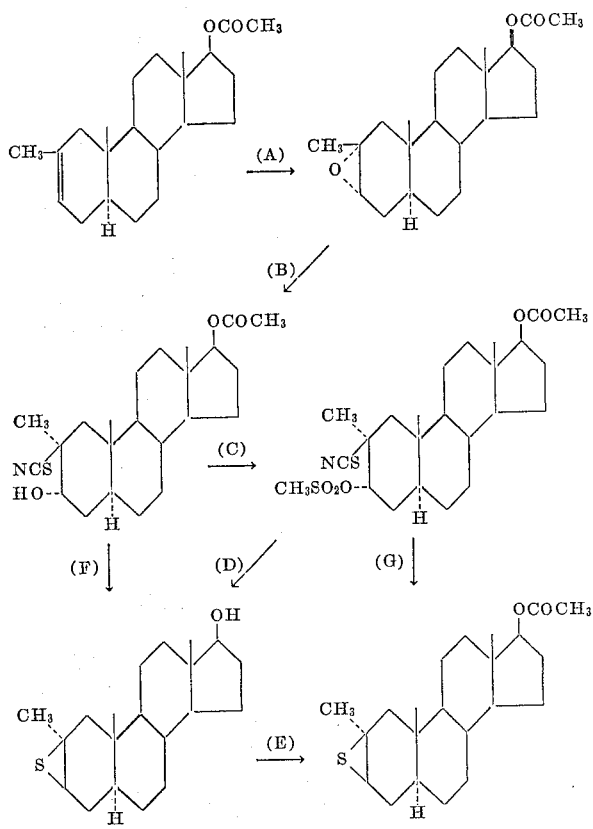

(A) *Preparation of 2β-methyl-2α,3α-epoxy-5α-androstan-17β-ol 17-acetate.*—To a solution of 2-methyl-5α-androst-2-en-17β-ol 17-acetate (1.935 g.) in a mixture of dichloromethane and ether (1:1) (40 ml.), there is added a solution of monoperphthalic acid (1.635 g.) in ether (15 ml.), and the resultant mixture is allowed to stand at 0° C. overnight. The reaction product is crystallized from acetone to give 2β-methyl-2α,3α-epoxy-5α-androstan-17β-ol 17-acetate (1.601 g.) as crystals melting at 208 to 210° C. $[\alpha]_D^{24} + 10.6 \pm 2°$ (c.=1.073, CHCl$_3$).

IR: $\nu_{max.}^{Nujol}$ cm.$^{-1}$: 1732, 1242, 1043, 1031, 919, 899, 809, 791

(B) *Preparation of 2α-methyl-2β-thiocyanato-5α-androstane-3α,17β-diol 17-acetate.*—To a solution of 2β-methyl-2α,3α-epoxy-5α-androstan-17β-ol 17-acetate (1.461 g.) in dichloromethane (10 ml.), there is added a solution of thiocyanic acid prepared from potassium thiocyanate (7 g.), phosphoric acid (11 g.) and ether (30 ml.), and the resulting mixture is allowed to stand at room temperature overnight. The reaction product is crystallized from a mixture of acetone and hexane to give 2α-methyl-2β-thiocyanato - 5α - androstane - 3α,17β - diol 17 -acetate (1.272 g.) as crystals melting at 183 to 184° C.

IR: $\nu_{max.}^{Nujol}$ cm.$^{-1}$: 3444, 2164, 1735, 1249, 1049, 1013, 1026

(C) *Preparation of 2α-methyl-2β-thiocyanato-3α-methanesulfonyloxy-5α-androstan-17β-ol 17-acetate.*—To a solution of 2α-methyl-2β-thiocyanato-5α-androstane-3α,17β-diol 17-acetate (580 mg.) in pyridine (12 ml.), there is added methanesulfonyl chloride (800 ml.) under cooling with ice, and the resulting mixture is allowed to stand at 0° C. overnight. The reaction mixture is poured into a mixture of ice and water and extracted with ether. The ether extract is washed with 10% hydrochloric acid, water, 10% sodium carbonate solution and water in order, dried over anhydrous sodium sulfate and the ether evaporated by distillation to give 2α-methyl-2β-thiocyanato-3α-methanesulfonyloxy-5α-androstan-17β-ol 17-acetate (689 mg.).

IR: $\nu_{max.}^{CCl_4}$ cm.$^{-1}$: 2171, 1737, 1251, 1186, 1034, 896

(D) *Preparation of 2α-methyl-2β,3β-epithio-5α-androstan-17-ol.*—To a solution of 2α-methyl-2β-thiocyanato-3α - methanesulfonyloxy - 5α - androstan - 17β -ol 17-acetate (689 mg.) in dioxane (10 ml.), there is added a solution of potassium hydroxide (911 mg.) in 90% methanol (22 ml.), and the resultant mixture is stirred at room temperaure overnight. After concentration under reduced pressure, water is added thereto. The resultant mixture is extracted with dichloromethane. The extract is crystallized from a mixture of acetone and hexane to give 2α-methyl-2β,3β-epithio-5α-androstan-17β-ol (250 mg.) as crystals melting at 155 to 157° C. $[\alpha]_D^{24} + 47.5 \pm 2°$ (c.=1.046, CHCl$_3$).

IR: $\nu_{max.}^{Nujol}$ cm.$^{-1}$: 3470, 1062, 1004, 988, 938

(E) *Preparation of 2α-methyl-2β,3β-epithio-5α-androstan-17β-ol 17-acetate.* — A mixture of 2α-methyl-2β,3β-epithio-5α-androstan-17β-ol (220 mg.), pyridine (3 ml.) and acetic anhydride (1 ml.) is allowed to stand at room temperature overnight. The reaction product is crystallized from a mixture of acetone and hexane to give 2α-methyl-2β,3β-epithio-5α-androstan-17β-ol 17-acetate (165 mg.) as crystals melting at 147 to 149° C.

$[\alpha]_D^{24} + 27.5 \pm 2°$ (c.=0.969, CHCl$_3$)

IR: $\nu_{max.}^{Nujol}$ cm.$^{-1}$ 1730, 1250, 1047, 1026, 914

(F) *Preparation of 2α-methyl-2β,3β-epithio-5α-androstan-17β-ol.*—To a solution of 2α-methyl-2β-thiocyanato-5α-androstane-3α,17β-diol 17-acetate (351 mg.) in dioxane (15 ml.), there is added a solution of potassium hydroxide (0.5 g.) in methanol (10 ml.), and the resulting mixture is refluxed for 30 minutes. The reaction mixture is concentrated under reduced pressure and then extracted with chloroform. The extract is crystallized from a mixture of acetone and hexane to give 2α-methyl-2β,3β-epithio-5α-androstan-17β-ol as crystals melting at 155 to 157° C.

(G) *Preparation of 2α-methyl-2β,3β-epithio-5α-androstan-17β-ol 17-acetate.*—A solution of 2α-methyl-2β-thiocyanato-3α-methanesulfonyloxy-5α-androstan - 17β-ol 17-acetate (212 mg.) and potassium carbonate (250 mg.) in diethyleneglycol dimethyl ether (20 ml.) is stirred at room temperature (10 to 20° C.) overnight. The reaction mixture is diluted with water. The precipitated crystals are collected by filtration and recrystallized from a mixture of acetone and hexane to give 2α-methyl-2β,3β-epithio-5α-androstan-17β-ol 17-acetate as crystals melting at 147 to 149° C.

Example 3

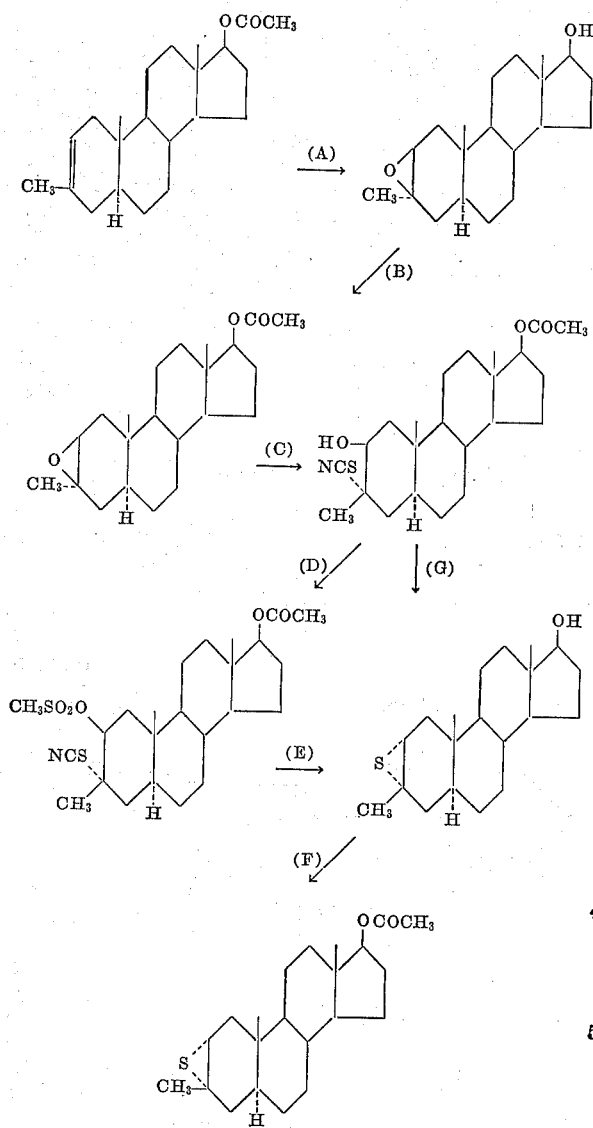

(A) *Preparation of 3α-methyl-2β,3β-epoxy-5α - androstan-17β-ol.*—To a solution of 3-methyl-5α-androst-2-en-17β-ol 17-acetate [Pelc: Collect. czecho. chem. Comm., 25, 1624 (1960)] (6.858 g.) in a mixture of dioxane (60 ml.) and water (17 ml.), there are added N-bromoacetamide (4.3 g.) and 60% perchloric acid (1.4 ml.), and the resulting mixture is stirred under cooling with ice for 30 minutes. After addition of a large amount of water, the precipitate is collected by filtration, washed with water, dried and treated with cold ether to separate an ether-soluble portion and an ether-insoluble portion. The soluble portion (6.854 g.) is refluxed with potassium hydroxide (6.8 g.) in isopropanol (120 ml.) for 1 hour. The reaction mixture is poured into a mixture of ice and water and extracted with ether. The extract is dissolved in a mixture of petroleum ether and benzene (1:1) and chromatographed on Florisil (114 g.). The eluates with benzene and with benzene-dichloromethane (95:5–75:25 are combined together and crystallized from ether and then a mixture of acetone and hexane to give 3α-methyl-2β,3β-epoxy - 5α - androstan-17β-ol (1.265 g.) as crystals melting at 189.5 to 192.5° C. $[\alpha]_D^{23.5}+46.5\pm2°$ (c.=1.014, CHCl$_3$).

IR: $\nu_{max.}^{Nujol}$ cm.$^{-1}$: 3398, 1083, 1066, 1059, 1040, 1028, 932, 905, 851, 840, 786, 698

(B) *Preparation of 3α-methyl-2β,3β-epoxy-5α - androstan-17β-ol 17-acetate.*— 3α-methyl-2β,3β-epoxy-5α-androstan-17β-ol (1.401 g.) is dissolved in a mixture of pyridine (5 ml.) and acetic anhydride (1.5 ml.), and the resultant mixture is allowed to stand at room temperature overnight. The reaction mixture is poured into a large amount of water. The precipitate is collected by filtration, washed with water, dried and crystallized from a mixture of acetone and hexane to give 3α-methyl-2β,3β-epoxy-5α-androstan-17β-ol 17-acetate (1.509 g.) as crystals melting at 177 to 180° C. $[\alpha]_D^{24}+37.2\pm2°$ (c.=1.014, CHCl$_3$).

IR: $\nu_{max.}^{Nujol}$ cm.$^{-1}$: 1731, 1253, 1050, 1035, 936, 913, 906, 891, 847, 704

(C) *Preparation of 3β-methyl-3α-thiocyanato - 5α - androstane-2β,17β-diol 17-acetate.*—To a solution of 3α-methyl-2β,3β-epoxy-5α-androstan-17β-ol 17-acetate (1.509 g.) in dichloromethane (7.5 ml.), there is added a solution of thiocyanic acid prepared from potassium thiocyanate (7.5 g.), phosphoric acid (11.3 g.) and ether (8 ml.), and the resulting mixture is allowed to stand at room temperature overnight. The reaction product is crystallized from a mixture of acetone and hexane to give 3β-methyl-3α-thiocyanato-5α-androstane-2β,17β-diol 17-acetate (1.395 g.) as crystals melting at 161 to 162.5° C. $[\alpha]_D^{25}+54.9\pm2°$ (c.=1.000, CHCl$_3$).

IR: $\nu_{max.}^{Nujol}$ cm.$^{-1}$: 3516, 2156, 1719, 1273, 1043

(D) *Preparation of 3β-methyl-2β-methanesulfonyloxy-3α-thiocyanto-5α-androstan-17β-ol 17-acetate.*—To a solution of 3β-methyl-3α-thiocyanato-5α-androstane-2β,17β-diol 17-acetate (1.598 g.) in pyridine (16 ml.), there is added methanesulfonyl chloride (2 ml.) while cooling with ice, and the resulting mixture is allowed to stand at 0° C. for 8 days. The reaction mixture is poured into a mixture of ice and water and extracted with ether. The ether extract is washed with water, 10% hydrochloric acid, water, 10% sodium carbonate solution and water in order, dried over anhydrous sodium sulfate and concentrated. The residue is crystallized from a mixture of ether and petroleum ether and recrystallized from a mixture of acetone and hexane to give 3β-methyl-2β-methanesulfonyloxy-3α-thiocyanato - 5α - androstan - 17β - ol 17 - acetate (1.056 g.) as crystals melting at 124 to 126° C. $[\alpha]_D^{24.5}+46.2\pm2°$ (c.=1.023, CHCl$_3$).

IR: $\nu_{max.}^{Nujol}$ cm.$^{-1}$: 2168, 1727, 1258, 1177, 1046, 1039, 956, 921, 896, 878, 812

(E) *Preparation of 3β-methyl-2α,3α-epithio-5α-androstan-17β-ol.*—To a solution of 3β-methyl-2β-methanesulfonyloxy-3α-thiocyanato-5α-androstan-17β-ol 17 - acetate (1.056 g.) in dioxane (30 ml.), there is added a solution of potassium hydroxide (1.1 g.) in methanol (23 ml.), and the resulting mixture is stirred for 2.5 hours. After addition of water (5 ml.), stirring is continued for 20 hours. The reaction mixture is combined with water and extracted with ether. The extract (700 mg.) is crystallized from a mixture of acetone and hexane to give 3β-methyl-2α,3α-epithio-5α-androstan-17β-ol (510 mg.) as crystals melting at 126 to 128° C. $[\alpha]_D^{25}+26.2\pm2°$ (c.=1.075, CHCl$_3$).

IR: $\nu_{max.}^{Nujol}$ cm.$^{-1}$: 3258, 1082, 1051, 1029, 1011, 990, 959

(F) *Preparation of 3β-methyl-2α,3α-epithio-5α-androstan-17β-ol 17-acetate.*—3β - methyl-2α,3α-epithio-5α-androstan-17β-ol (128 mg.) is acetylated with pyridine (0.5 ml.) and acetate anhydride (0.25 ml.). The reaction product is crystallized from acetone to give 3β-methyl-2α,3α-epithio-5α-androstan-17β-ol 17-acetate as crystals melting at 138.5 to 140.5° C. [α]$_D^{23.5}$+20.2±2° (c=1.074, CHCl$_3$).

IR: $\nu_{max}^{Nujol}$ cm.$^{-1}$: 1734, 1251, 1046, 1032, 955, 906, 895

In the similar manner, treatments of 3β-methyl-2α,3α-epithio-5α-androstan-17β-ol with propionic anhydride in aqueous sodium hydroxide solution of pyridine, butyric anhydride in pyridine, valeric anhydride in pryridine or triethylamine, trimethylacetyl chloride in pyridine and enanthyl bromide in pyridine afford respectively the corresponding 17-propionate, butyrate, valerate, trimethylacetate and enanthate.

(G) *Preparation of 3β-methyl-2α,3α-epithio-5α-androstan-17β-ol.*—To a solution of 3β-methyl-3α-thiocyanato-5α-androstane-2β,17β-diol 17-acetate (432 mg.) in dioxane (20 ml.), there is added a solution of potassium hydroxide (0.5 g.) in 90% methanol (15 ml.), and the resulting mixture is stirred at room temperature (10 to 20° C.) for 2 days. After addition of water, the reaction mixture is extracted with dichloromethane. The extract is crystallized from a mixture of acetone and hexane to give 3β-methyl-2α,3α-epithio-5α-androstan-17β - ol as crystals, melting at 126 to 128° C.

methyl-3α-thiocyanato-5α-androstane-2β,17β-diol 17-acetate (100 mg.), pyridine (0.5 ml.) and acetic anhydride (0.25 ml.) is allowed to stand at room temperature for 48 hours. The reaction product is crystallized from a mixture of acetone and hexane to give 3β-methyl-3α-thiocyanato-5α-androstane-2β,17β-diol, 2,17-diacetate as crystals melting at 209.5 to 210.5° C. (α]$_D^{23.5}$ +58.0±2° (c.=0.848, CHCl$_3$).

IR: $\nu_{max}^{Nujol}$ cm.$^{-1}$: 2150, 1734, 1225, 1039, 1025

(E) *Preparation of 3β-methyl-2α,3α-epithio-5α-androstan-17β-ol.*—To a solution of potassium hydroxide (0.3 g.) in 90% ethanol (10 ml.), there is added 3β-methyl-3α-thiocyanato-5α-androstane-2β,17β-diol 2,17-diacetate (130 mg.) and the resultant mixture is refluxed for 2 hours. After removal of ethanol, the resulting product is combined with water and extracted with dichloromethane. The extract is crystalized from a mixture of acetone and hexane to give 3β-methyl-2α,3α-epithio-5α-androstan-17β-ol as crystals melting at 126 to 128° C.

*Example 5*

*Example 4*

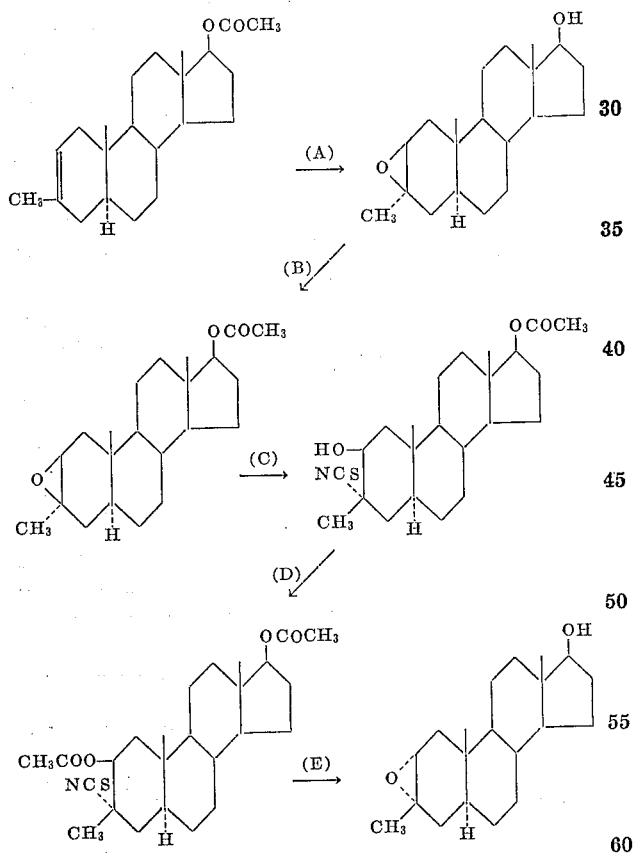

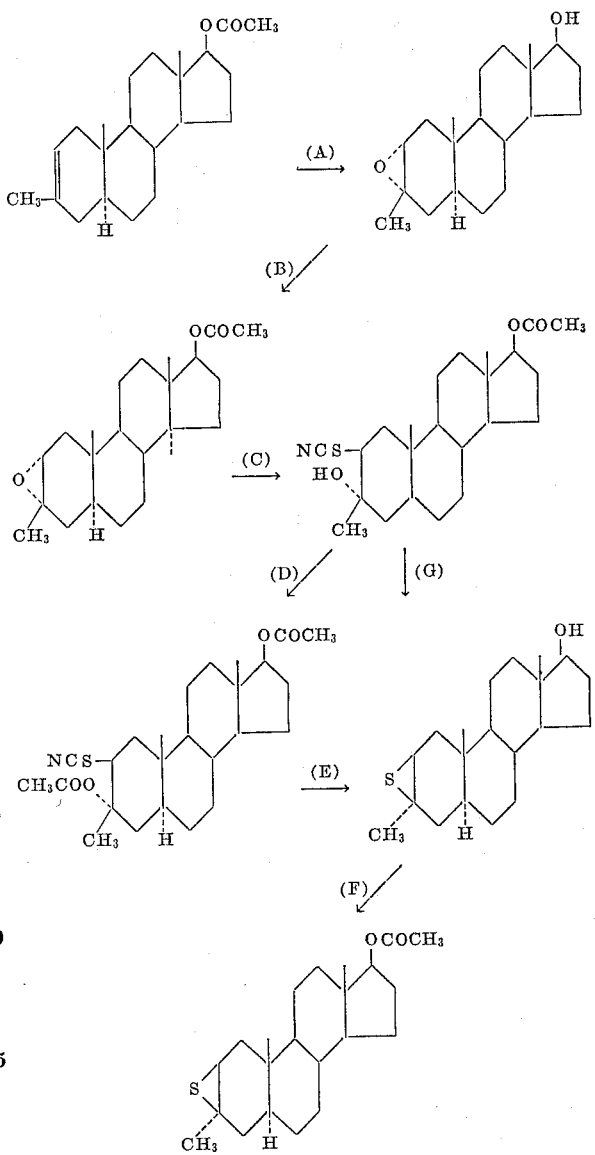

(A) *Preparation of 3α-methyl-2β,3β-epoxy-5α-androstan-17β-ol.*—As in Example 3(A), 3α-methyl-2β,3β-epoxy-5α-androstan-17β-ol is prepared from 3-methyl-5α-androst-2-en-17β-ol 17-acetate.

(B) *Preparation of 3α-methyl-2β,3β-epoxy-5α-androstan-17β-ol 17-acetate.*—As in Example 3(B), 3α-methyl-2β,3β-epoxy-5α-androstan-17β-ol 17-acetate is prepared from 3α-methyl-2β,3β-epoxy-5α-androstan-17β-ol.

(C) *Preparation of 3β-methyl-3α-thiocyanato-5α-androstane-2β,17β-diol 17-acetate.*—As in Example 3(C), 3β - methyl - 3α - thiocyanato - 5α - androstane - 2β,17β-diol 17-acetate is prepared from 3α-methyl-2β,3β-epoxy-5α-androstan-17β-ol 17-acetate.

(D) *Preparation of 3β-methyl-3α-thiocyanato-5α-androstane-2β,17β-diol 2,17-diacetate.*—A mixture of 3β-

(A) *Preparation of 3β-methyl-2α,3α-epoxy-5α-androstan-17β-ol.*—To a solution of 3-methyl-5α-androst-2-en-17β-ol 17-acetate (6.858 g.) in a mixture of dioxane (60 ml.) and water (17 ml.), there are added N-bromoacetamide (4.3 g.) and 60% perchloric acid (1.4 ml.), and the resulting mixture is stirred under cooling with ice for 30 minutes. After addition of a large amount of water, the precipitate is collected by filtration, washed with water, dried and treated with cold ether to separate an ether-soluble portion and an ether-insoluble portion. The insoluble portion (2.642 g.) is refluxed with potassium hydroxide (2.6 g.) is isopropanol (50 ml.) for 1 hour, and water is added thereto. The precipitate is collected by filtration, dried and crystallized from a mixture of ether and petroleum ether to give 3β-methyl-2α,3α-epoxy-5α-androstan-17β-ol (1.880 g.) as crystals melting at 126 to 128° C. $[\alpha]_D^{23.5}$ +32.8±2° (c.=0.992, CHCl$_3$).

IR: $\nu_{max.}^{Nujol}$ cm.$^{-1}$: 3495, 1085, 1065, 1055, 1048, 1028, 960, 875, 809, 800

(B) *Preparation of 3β-methyl-2α,3α-epoxy-5α-androstan-17β-ol 17-acetate.*—A mixture of 3β-methyl-2α,3α-epoxy-5α-androstan-17β-ol, pyridine and acetic anhydride is allowed to stand at room temperature overnight. The reaction product is crystallized from hexane to give 3β-methyl-2α,3α-epoxy-5α-androstan-17β-ol 17-acetate as crystals melting at 134 to 136° C. $[\alpha]_D^{23}$ +22.1±2° (c.=0.989, CHCl$_3$).

IR: $\nu_{max.}^{Nujol}$ cm.$^{-1}$: 1739, 1252, 1238, 1044, 1035, 959, 895, 875, 843, 812, 803

(C) *Preparation of 3β-methyl-2β-thiocyanato-5α-androstane-3α,17β-diol 17-acetate.*—To a solution of 3β-methyl-2α,3α-epoxy-5α-androstan-17β-ol 17-acetate (1.977 g.) in dichloromethane (10 ml.), there is added a solution of thiocyanic acid (10 ml.) prepared from potassium thiocyanate (10 g.), phosphoric acid (15.5 g.) and ether (10 ml.), and the resultant mixture is allowed to stand at room temperature for 2 days. The reaction mixture is extracted with chloroform. The extract is crystallized from a mixture of acetone and hexane to give 3β-methyl-2β-thiocyanato-5α-androstane-3α,17β-diol 17-acetate (2.05 g.) as crystals melting at 168 to 170° C. $[\alpha]_D^{23.5}$+55.1±2° (c.=0.970, CHCl$_3$).

IR: $\nu_{max.}^{Nujol}$ cm.$^{-1}$: 3496, 3390, 3198, 2172, 1713, 1278, 1265, 1047, 1035

(D) *Preparation of 3β-methyl-2β-thiocyanato-5α-androstane-3α,17β-diol 3,17-diacetate.*—To a solution of 3β-methyl-2β-thiocyanato-5α-androstane-3α,17β-diol 17-acetate (1.802 g.) in acetic acid (20 ml.), there are added acetic anhydride (9 ml.) and p-toluenesulfonic acid (400 mg.), and the resulting mixture is allowed to stand at room temperature overnight. After addition of water, the precipitate is collected by filtration, washed with water, dried and crystallized from a mixture of acetone and hexane to give 3β-methyl-2β-thiocyanato-5α-androstane-3α,17β-diol 3,17-diacetate (1.900 g.) as crystals melting at 177 to 178.5° C. $[\alpha]_D^{24}$+72.5° (c.=1.077, CHCl$_3$).

IR: $\nu_{max.}^{Nujol}$ cm.$^{-1}$: 2164, 1730, 1251

(E) *Preparation of 3α-methyl-2β,3β-epithio-5α-androstan-17β-ol.*—A mixture of 3β-methyl-2β-thiocyanato-5α-androstane-3α,17β-diol 3,17-diacetate (1.900 g.) and potassium hydroxide (2.0 g.) in ethanol (70 ml.) is refluxed for 1 hour. The reaction mixture is combined with water and extracted with dichloromethane. The extract is chromatographed on Florisil. The obtained crude product is crystallized from a mixture of acetone and hexane to give 3α-methyl-2β,3β-epithio-5α-androstan-17β-ol (736 mg.) as crystals melting at 125 to 127° C.

$[\alpha]_D^{24}$+46.5±2° (c.=1.065, CHCl$_3$)

IR: $\nu_{max.}^{Nujol}$ cm.$^{-1}$: 3330, 1081, 1062, 1035, 1014, 995, 961, 929

(F) *Preparation of 3α-methyl-2β,3β-epithio-5α-androstan-17β-ol 17-acetate.*—3α-methyl-2β,3β-epithio-5α-androstan-17β-ol (141 mg.) is acetylated with pyridine (0.5 ml.) and acetic anhydride (0.2 ml.). The reaction product is crystallized from a mixture of acetone and hexane to give 3α-methyl-2β,3β-epithio-5α-androstan-17β-ol 17-acetate as crystals melting at 133 to 135° C.

$[\alpha]_D^{24}$+27.2±2° (c.=1.056, CHCl$_3$)

IR: $\nu_{max.}^{Nujol}$ cm.$^{-1}$: 1727, 1252, 1045, 1034, 1020, 976, 932, 916

(G) *Preparation of 3α-methyl-2β,3β-epithio-5α-androstan-17β-ol.*—A mixture of 3β-methyl-2β-thiocyanato-5α-androstan-3α,17β-ol 17-acetate (0.85 g.) and potassium hydroxide (1.0 g.) in 90% ethanol (30 ml.) is stirred at room temperature (10 to 20° C.) overnight. The reaction mixture is combined with water and extracted with dichloromethane. The extract is crystallized from a mixture of acetone and hexane to give 3α-methyl-2β,3β-epithio-5α-androstan-17β-ol as crystals melting at 125 to 127° C.

What is claimed is:
1. 2β-methyl-2α,3α-epithio-5α-androstan-17β-ol.
2. A process for preparing 2- or 3-alkyl-2,3-epithio-steroid having one of the general formulae:

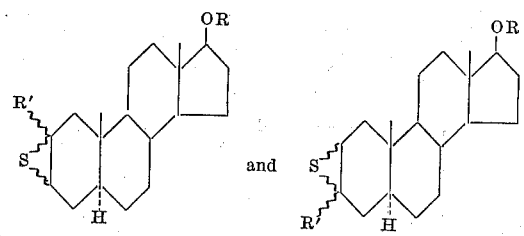

wherein
R is a hydrogen atom or a lower alkanoyl group,
R′ is a lower alkyl group and the ripple mark ($) is a generic indication of α- and β-configurations, which comprises subjecting a 2- or 3-alkyl-Δ²-steroid having one of the general formulae:

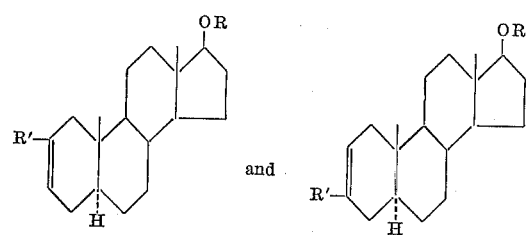

wherein R and R′ each have the same significance as designated above to treatment as follows:
(a) treatment with an epoxidizing agent in an inert solvent at a temperature from about −10° C. to the boiling point of the solvent used for up to a period of from about 1 to 150 hours, or
(b) treatment with a combination of a halogenating agent and a base wherein the halogenating agent is brought into reaction in an inert solvent at a temperature of from about 0° C. to the boiling point of the solvent used for up to about 10 hours and the base is brought into reaction simultaneously with the halogenating agent or subsequent to the addition of the halogenating agent in an inert solvent at a temperature of from about room temperature to the boiling point of the solvent used for up to about 24 hours, subjecting the resultant 2- or 3-alkyl-2,3-epoxy-steroid having one of the general formulae:

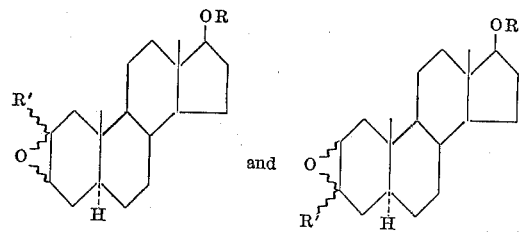

wherein R and R′ each have the same significance as designated above to treatment as follows:
(1) treatment with thiocyanic acid or salt thereof, or
(2) treatment with thiocyanic acid or salt thereof followed by a halogenation or acylation process, the treatment with thiocyanic acid or salt thereof being carried out in an inert solvent at a temperature of from about 0° C. to the boiling point of the solvent used for up to about 5 days, and subjecting the resultant 2- or 3-alkyl-2- or 3-thiocyanato-steroid having one of the general formulae:

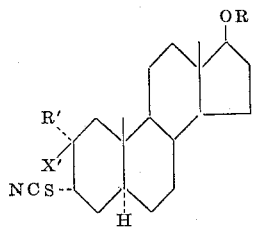 , 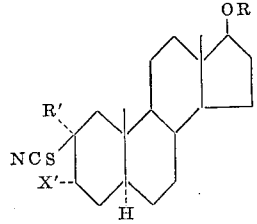

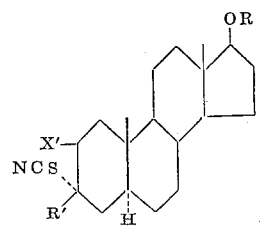 and 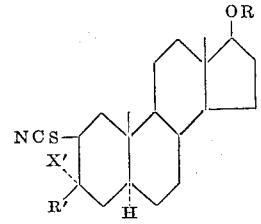

wherein X′ is a hydroxyl group, a halogen atom, a lower alkanoyloxy group, a lower alkanesulfonyloxy group, a benzene-sulfonyloxy group or a lower alkylbenzenesulfonyloxy group and R and R′ each have the same significance as designated above to treatment as follows:
(i) treatment with a basic agent, or
(ii) treatment with a basic agent followed by an acylation process,
the treatment with the basic agent being carried out in an inert solvent at a temperature not higher than 100° C. for up to about 5 days.

References Cited
UNITED STATES PATENTS 3,105,831 10/1963 Komeno _____ 260—239.5
3,169,128 2/1965 Komeno _____ 260—239.5
3,230,215 1/1966 Komeno _____ 260—239.5

OTHER REFERENCES

Takeda et al.: "Tetrahedron," vol. 21, February 1965, pp. 329–351.
Tori et al.: "Journal Org. Chem.," vol. 29, No. 5, May 1964, pp. 1136–1141.

LEWIS GOTTS, *Primary Examiner.*

ELBERT L. ROBERTS, *Examiner.*

JOHNNIE R. BROWN, *Assistant Examiner.*